United States Patent
Kusnanto et al.

(10) Patent No.: US 10,489,777 B2
(45) Date of Patent: Nov. 26, 2019

(54) UNIVERSAL ACCESS TO AN ELECTRONIC WALLET

(71) Applicant: VISA INTERNATIONAL SERVICE ASSOCIATION, San Francisco, CA (US)

(72) Inventors: Sidharta Surya Kusnanto, Foster City, CA (US); Santosh Shahane, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 623 days.

(21) Appl. No.: 14/988,585

(22) Filed: Jan. 5, 2016

(65) Prior Publication Data

US 2017/0193499 A1 Jul. 6, 2017

(51) Int. Cl.
| | | |
|---|---|---|
| *G06Q 20/36* | (2012.01) | |
| *H04L 29/08* | (2006.01) | |
| *G06Q 20/40* | (2012.01) | |
| *G06Q 20/10* | (2012.01) | |
| *H04L 29/06* | (2006.01) | |
| *G06F 21/33* | (2013.01) | |
| *G06Q 20/12* | (2012.01) | |
| *G06Q 20/32* | (2012.01) | |

(Continued)

(52) U.S. Cl.
CPC ....... *G06Q 20/3674* (2013.01); *G06F 21/335* (2013.01); *G06Q 20/10* (2013.01); *G06Q 20/12* (2013.01); *G06Q 20/3223* (2013.01); *G06Q 20/385* (2013.01); *G06Q 20/401* (2013.01); *G06Q 20/4012* (2013.01); *G06Q 20/40145* (2013.01); *H04L 63/0807* (2013.01); *H04L 63/18* (2013.01); *H04L 67/02* (2013.01); *H04L 63/0861* (2013.01); *H04L 67/2814* (2013.01); *H04L 2463/102* (2013.01); *H04W 4/00* (2013.01)

(58) Field of Classification Search
None
See application file for complete search history.

(56) References Cited

U.S. PATENT DOCUMENTS

| | | | | |
|---|---|---|---|---|
| 9,948,627 | B1 * | 4/2018 | Cassar | .......... H04L 63/08 |
| 2004/0249753 | A1 * | 12/2004 | Blinn | .......... G06Q 20/10 |
| | | | | 705/41 |

(Continued)

FOREIGN PATENT DOCUMENTS

TW 200511080 3/2005

OTHER PUBLICATIONS

Apple, "App ID", Apple Library Document, Updated Oct. 21, 2015, Retrieved on Mar. 24, 2017 from Internet <URL: https://developer.apple.com/library/content/documentation/General/Conceptual/DevPedia-CocoaCore/AppID.html>, 2 pages.

(Continued)

*Primary Examiner* — Steven S Kim
*Assistant Examiner* — Timothy Paul Sax
(74) *Attorney, Agent, or Firm* — Loeb & Loeb LLP (57) ABSTRACT

The described system and method allows a contact such as a mobile phone number to be associated with a specific mobile wallet account and by submitting a mobile phone number to an ecommerce site, a URL will be communicated to the contact which opens the payment wallet with the relevant information from the ecommerce transaction.

17 Claims, 4 Drawing Sheets

(51) Int. Cl.
  *G06Q 20/38* (2012.01)
  *H04W 4/00* (2018.01)

(56) References Cited

U.S. PATENT DOCUMENTS

| | | |
|---|---|---|
| 2009/0098854 A1 | 4/2009 | Park |
| 2011/0246284 A1* | 10/2011 | Chaikin ............... G06Q 20/105 705/14.38 |
| 2012/0084119 A1* | 4/2012 | Vandehey .......... G06Q 30/0202 705/7.31 |
| 2012/0095852 A1* | 4/2012 | Bauer .................. G06Q 20/105 705/16 |
| 2012/0284195 A1 | 11/2012 | McMillen |
| 2012/0330769 A1* | 12/2012 | Arceo .................... G06Q 20/32 705/21 |
| 2013/0036048 A1 | 2/2013 | Campos et al. |
| 2013/0054336 A1 | 2/2013 | Graylin |
| 2013/0103584 A1* | 4/2013 | Eichner .................. G06Q 20/02 705/44 |
| 2013/0110658 A1* | 5/2013 | Lyman .................. G06Q 20/20 705/18 |
| 2013/0191227 A1* | 7/2013 | Pasa ................... G06Q 20/3674 705/14.73 |
| 2013/0317923 A1 | 11/2013 | Capps et al. |
| 2014/0012751 A1* | 1/2014 | Kuhn ..................... G06Q 20/36 705/41 |
| 2014/0222594 A1 | 8/2014 | Rose et al. |
| 2014/0294253 A1* | 10/2014 | Bohne ................... H04N 19/91 382/117 |
| 2015/0127527 A1 | 5/2015 | Eide |
| 2015/0363785 A1 | 12/2015 | Perez et al. |
| 2015/0379484 A1 | 12/2015 | McCarthy |
| 2016/0224966 A1 | 8/2016 | Vans Os et al. |
| 2017/0098208 A1* | 4/2017 | Argyopoulos ....... G06Q 20/327 |

OTHER PUBLICATIONS

PCT, Notification of Transmittal of the International Search Report and the Written Opinion of the International Searching Authority, or the Declaration, 14 pages dated Mar. 16, 2017 in corresponding PCT/US2017/012180.
Extended European Search Report for EP17736252.0, dated Nov. 14, 2018, 11 pages.

* cited by examiner

UNIVERSAL ACCESS TO AN ELECTRONIC WALLET

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electronic wallets and payment systems have become more and more common. While the wallets themselves are relatively easy to use, the wallets have to be added to e-commerce web sites. The additional coding on the e-commerce web site may be cumbersome and may create conflicts with existing code. Further, the expertise necessary to add the wallet code can be a challenge to find and may be expensive. At the same time, users appreciate the ease of use of a mobile wallet where lengthy personal account numbers are not necessary.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

The described system and method allows a contact such as a mobile phone number to be associated with a specific mobile wallet account and by submitting a mobile phone number to an ecommerce site, a URL will be communicated to the contact which opens the payment wallet with the relevant information from the ecommerce transaction.

The figures depict a preferred embodiment for purposes of illustration only. One skilled in the art may readily recognize from the following discussion that alternative embodiments of the structures and methods illustrated herein may be employed without departing from the principles described herein.

SPECIFICATION

The described system and method allows a contact such as a mobile phone number to be associated with a specific mobile wallet account and by submitting a mobile phone number to an e-commerce site, a URL will be communicated to the contact which opens the payment wallet with the relevant information from the ecommerce transaction. The system has hardware specifically designed to implement the easier way to integrate a payment wallet into a merchant website and payment system.

Figure 1:
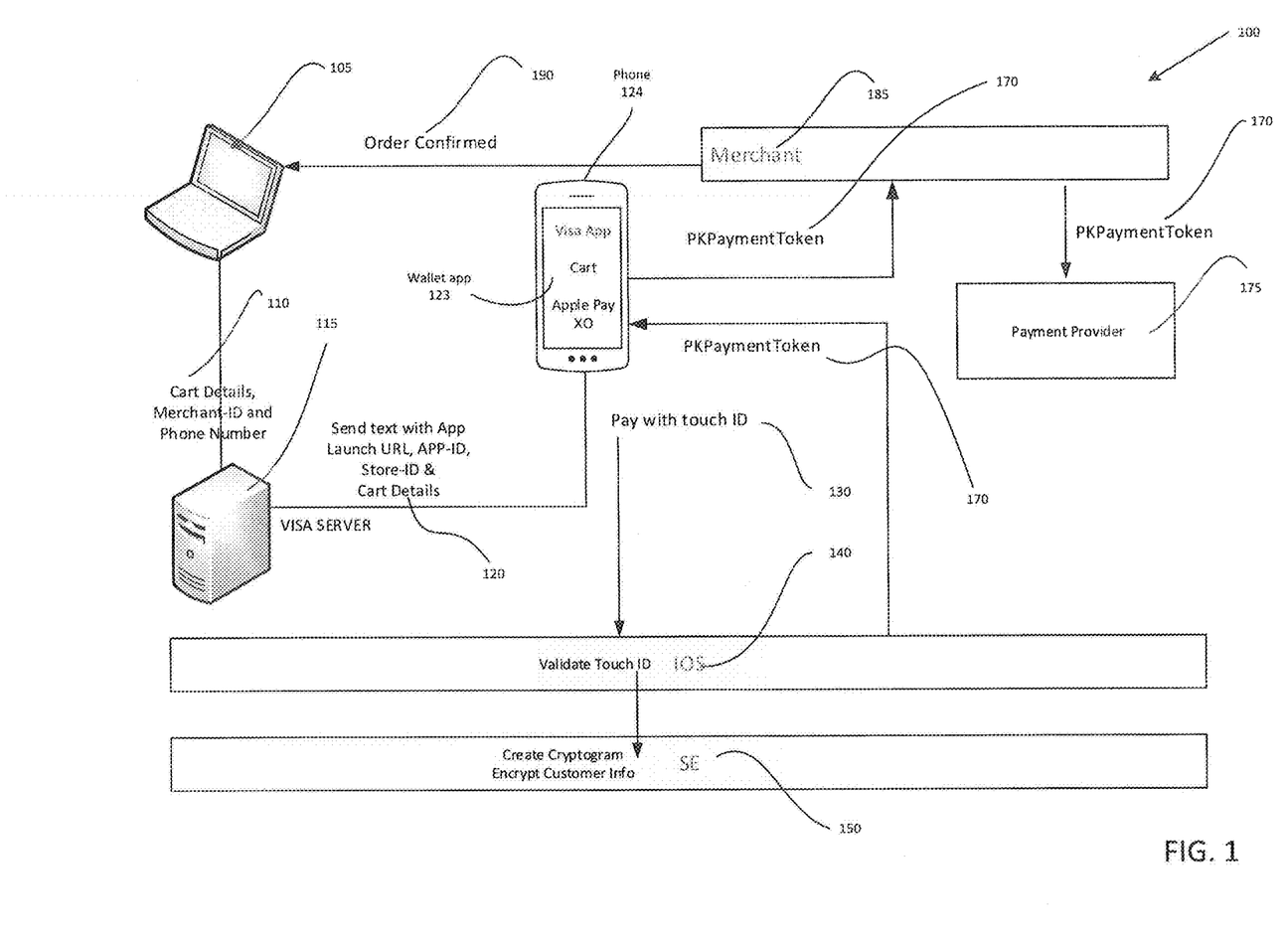
FIG. 1 illustrates a flow of the system accepting a phone number and using a token to execute a transaction.

Referring to FIG. 1, a system 100 for creating communications to effectuate a purchase using an electronic wallet system may be disclosed. The system 100 may have a variety of purpose designed components as will be described in the application. At a high level, the system 100 may use a purchasing computing device which may be a portable computing device such as a smart phone or a dedicate purchase terminal at a merchant or a traditional computing system such as a laptop 105. The merchant 185 may have a sales server which may display items for sale, collect payment data and coordinate shipment of goods. A card issuer may have a transaction server 115 which may take in the data from the purchasing computer device 105 and may respond to the purchasing computer with a URL to enable a payment wallet prefilled with data from the purchasing computing device. The payment may be validated through a validation server 140 which may use a token server 150 to create an electronic token 170 to complete the transaction. Finally, the token 170 may be verified by a token service 175.

The advantage to the service is that merchant web sites will have to perform a minimum amount of programming to accept a payment from an electronic wallet. In one embodiment, a consumer may be shopping on a merchant web site. The user may select some goods to be purchased. When the user is ready to purchase the goods, a user often is faced with a variety of choices of how to pay for the goods. In some situations, a user may enter credit card information.

In some additional situations, if the e-commerce site and dedicated e-commerce server have been set up, the site may accept a mobile wallet payment. Mobile wallets 123 are usually set up in advance. A user may create an account an add a variety of payment devices such as credit cards, bank accounts, reward points, etc., to an account. The account may be accessed by entering a user name and a form of verification which may include a password, a PIN, a form of biometric verification such as a fingerprint, etc. Once verified, the user may select from the plurality of payment devices previously associated with the mobile wallet.

Currently, merchants have to add functionality such that the mobile wallets 123 will work with the merchant web site. For example, a user may not simple type "use mobile wallet" into a web site and have a payment occur. The merchant web site may need the appropriate software and/or hardware to enable the mobile wallet 123 application. Specifically, the application must be enabled to receive a name and a log in to enable the mobile wallet 123. Further, while wallet applications 123 are secure, more security may be added by including a second communication channel to the system 100.

In the described solution, a user may only have to enter a code such as a mobile phone number 110 that has previously been set up with a mobile wallet 123. The mobile phone number may be communicated from a server related to the merchant web site to a payment server 115 which may recognize the code and start a transaction process which may include communicating a message 120 to the user to start the payment transaction using a mobile wallet 123, even if the web site is not set up to use a mobile wallet 123. The equipment and programming required by the merchant may be minimal but the merchant may still make the sale easy for the consumer.

Figure 2:
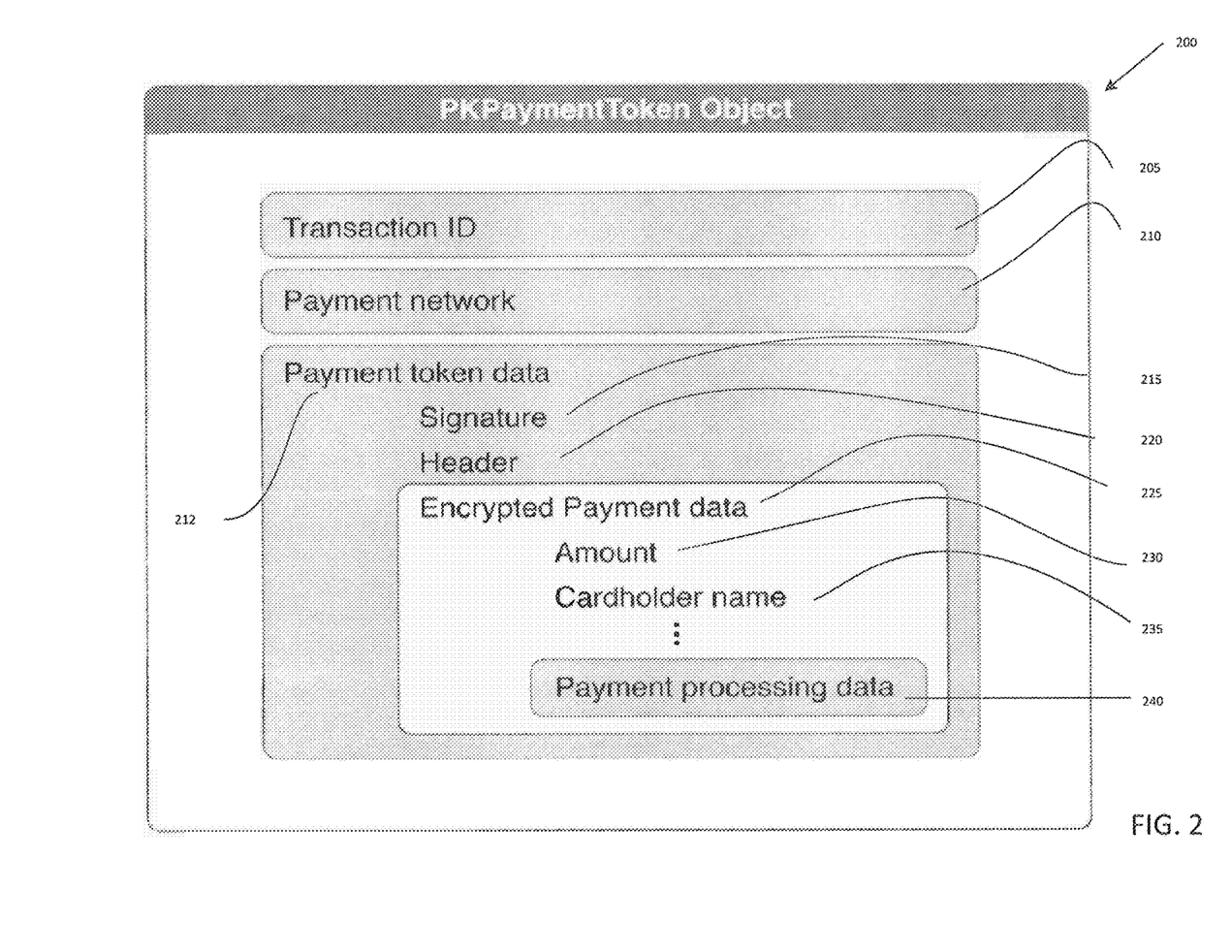
FIG. 2 illustrates a sample token and sample data in the token.
Figure 3:
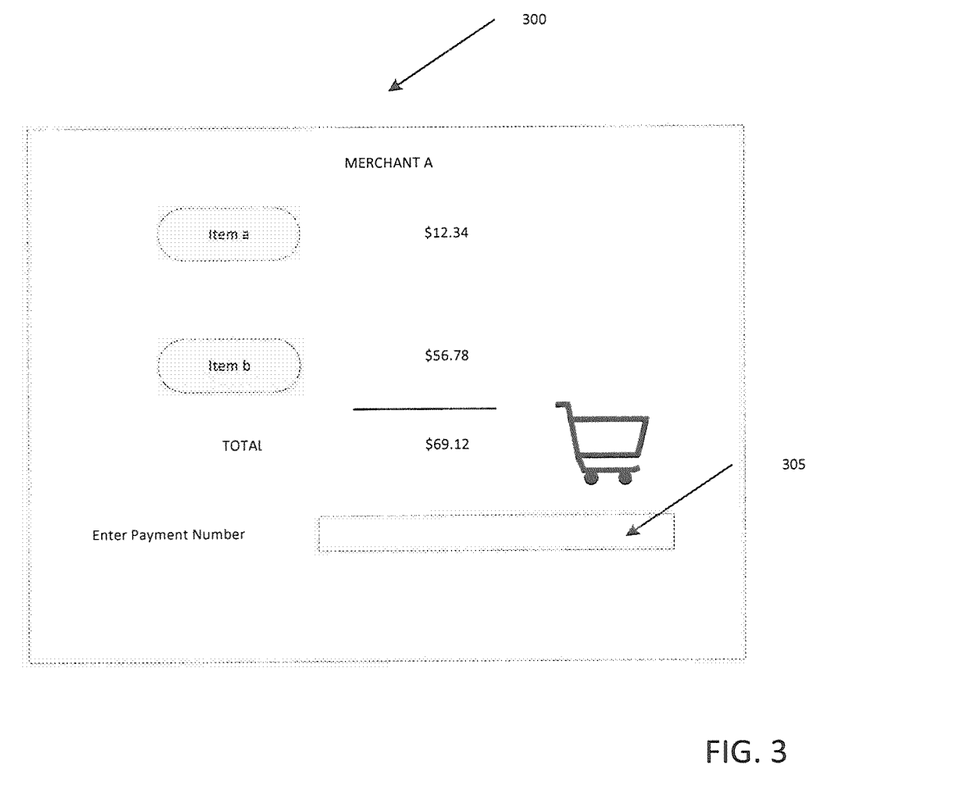
FIG. 3 illustrates a sample user interface to use the system.

Referring to FIG. 2, at block 105, a processor may be used to receive an electronic contact message 110. The processor may be in a server such as in FIG. 4 or may be in a dedicated contact receiving server. The form and content of the electronic contact message 110 may take on a variety of forms.

In some embodiments, the electronic contact message 110 may be a mobile phone number previously indicated as being related to the electronic wallet system 123. Some mobile payments systems 100 may use a phone number as a code to be used as an identifier of a mobile wallet 123. In other embodiment, the phone number may be used as an indication of a mobile address to be used to communicate a signal to enter the mobile payment system. In other embodiments, the electronic message 110 may be an alpha or numeric code that is associated with an additional electronic address.

The contact message 110 may also include an indicator of an item selected for purchase. For example, if a user has selected a pair of sneakers in a specific type, color and size, the contact message 110 may include details which may allow the item (or items) to be identified by the merchant. Again, the indication may be numeric, alpha, a combination of alpha and numeric or any other appropriate manner of identifying a good.

The contact message 110 may also include a merchant identifier. The identifier may be used to arrange for the transaction to be coordinated through the various parties to a transaction. The contact message 110 may also include additional information such as a ship to address, a preferred shipping method, etc. The contact message 110 may be communicated via a mobile communication server.

At block 120, a processor or a dedicated response server may be used to communicate a response message to the contact message. The response message 120 may be created and communicate via a response server 115. The response message 120 may include a Uniform Resource Locator (URL) to the electronic wallet system. The URL may be in a variety of forms such as a tiny URL, a traditional URL or another form that will be understood by the receiving system.

In some embodiments, the response message 120, such as the URL, may be communicated using a second communication channel. For example, the response message 120 may be communicated to the laptop 105 via an SMS text message while other messages may be communicated as emails. In yet another embodiment, the communication may be through an app.

The URL in the response message 120 may link to a wallet app 123 wherein the wallet app 123 may be pre-populated with the merchant identification and the selected items. The merchant and selected items may be indicated in the response communication 120. The merchant may be used to indicate in the mobile app 123 the merchant that will be paid which may provide comfort to the consumer.

The response message 120 may also be include an APP-ID. The App ID may include a Team ID and a bundle ID search string which may be related to the development of the application. The APP-ID may be used for security purposes such as verifying the app is valid and that the user is not being spoofed or otherwise being asked to provide information in an unsecure manner.

In some embodiments, the response message 120 may include a Store ID or a Merchant-ID. The Store ID and or the Merchant ID may be used to provide funds to the appropriate party to the transaction. The names also may be displayed in the wallet app to give comfort to the consumer that the money is going to the desire location.

The item selected details may include sufficient information such that the items selected may be identified. The selected details may be received from a merchant web site or a merchant application. The selected details may be encrypted or may use a code to reduce the size of the communication packet. The details may be held, compressed and communicated by a dedicated inventory server.

Logically, the response message 120 which may include the APP-ID, Store/Merchant-ID and Card Details, may follow a pre-determined protocol. The protocol may be known and may be publically available or may be private to parties that are part of the payment network. Specifically, certain entries in a communication may represent an APP-ID and the position of these entries may be known such that the message does not have to be searched to find the APP-ID. A similar design may be used for the Store/Merchant-ID and the Card Details.

In some embodiments, the URL in the response message 120 may contain the payment details and the payment details may be utilized by the wallet app 123. In another embodiment, the payment details may be stored remotely and may be accessed by the wallet app 123 to complete the transaction. For example, the URL may reference a code which is related to a payment device and the wallet app 123 may use the code to select the desire payment device which may be stored locally or remotely. Each arrangement has advantages and disadvantages and a combination of the two storage locations is possible and is contemplated.

Referring again to FIG. 1, at block 130, a selection of the URL may be received at an address previously associated with a mobile wallet app 123 such as when the address is a phone number and the message is an SMS message. The manner of indicating an address such as a phone number is related to a mobile payment system like a mobile wallet 123 may be accomplished in advance and may include signing into a payment application, verifying authorization to use the payment application, in response to the authorization being verified, receiving an address such as a mobile number, communicating a test message to the mobile number wherein the test message comprises a URL and in response to an acceptable message being received from the URL, storing that the mobile number is verified as being related to the mobile payment system.

The selection of the URL in the payment system in block 120 may be made in a variety of ways and may depend on the device 124 being used. If the device 124 is a portable computing device 124, the selection may be made using a touch screen or a button. If the device 124 is a computing device, the selection may be made using a keyboard or a mouse. In addition, the selection may be made using any appropriate input device for the computing device 124. The URL may redirects a browser to open the electronic wallet system 123.

In one embodiment, the payment details may be used to create a transaction in the electronic wallet system 123. Logically, for a payment to be made, an account to pay for the transaction may be required and an account to receive the payment may be necessary. Electronic wallet systems 123 may operate in a variety of ways, all of which may be an acceptable part of the system 100. The wallet application 123 may use the received payment details to create a transaction which charges the user and provides funds to the merchant. The transaction details may be used to ensure the user is receiving the desired goods.

Token

In some embodiments, an electronic token 170 may be used as part of the electronic wallet system 123. One such embodiment is illustrated in FIG. 1. As described previously, a user at a first computing device 105 such as a laptop may create an order to a merchant. The cart details, merchant id and contact, such as a phone number of the purchaser, may be communicated 110 to the Service Server 115. The Service Server 115 may communicate a response message 120 to the user using a second communication channel which may contain the launch URL, APP-ID, Store ID and cart details. The user may select the URL in the message which may activate a link to verify the finger touch as belonging to an acceptable user 130.

If the contact entered is not recognized, the response will not be sent. In addition, if the contact is being guessed by a malicious user, the response message may be communicated to a different party as the contact may be registered to an unknown address to the malicious user. For example, if a mobile phone 124 is used as the contact, a malicious user may have to have access to the user's mobile phone 124 to receive the response message to complete the transaction. Further the wallet app 123 requires additional inputs of identification which may further safeguard the system from a malicious user.

At block 130, a processor may be used to authenticate the payment details in the URL through the mobile wallet 123. In one embodiment, bio identification may be used. For example, a processor may be used to authenticate the payment details in the URL through the mobile wallet 123 by receiving a bio identification such as a fingerprint, a voiceprint, or any other unique bio identifier. The received bio identification may be compared to a stored bio identification and the comparison may be scored. If the bio identification is scored over a threshold, the transaction may be approved 140. If the bio identification is scored under a threshold, the transaction may be denied. The bio-identification may be performed locally or on a remote computing device specifically built and adapted to verify bio-inputs.

In another embodiment, a personal identification number (PIN) may be used to authenticate the user 130. A PIN may be received. The received PIN may be compared to a stored PIN for the account and the comparison may be scored. If the PIN is scored over a threshold, the transaction may be approved. If the PIN is scored under a threshold, the transaction may be denied.

If the user is verified, a payment token may be created 150. The token may contain a one-time use personal account number (PAN) which is related to an existing personal account number (PAN). The payment token may be provided by specifically designed token server which may track the relationship between the one time use PAN and the existing PAN such that the one time use PAN may be communicated to a vendor where it may be authorized and used to connect to the existing PAN. The token server may be extremely high speed devices such that numerous tokens may be created and tracked at the same time. Further, the tokens may by encrypted or may be part of a cryptogram which may be very computationally intensive.

The payment token 150 may be communicated from token server 150 to a wallet application 123. FIG. 2 may be a high level illustration of the elements in a sample token 200. The token 200 may have a transaction ID 205 such that the transaction may be tracked. The token may also include a payment network 210 to be used. As there may be a plurality of payment networks 210, the payment network may assist in effectively routing the transaction. The Payment Token Data 212 may also include encrypted payment data 225, such as an amount 230, a cardholder name 235, and other relevant data such as payment processing data 240. As mentioned previously, a token server may use a purpose built processor to create the token, track the use of the token and verify the token.

Referring again to FIG. 1, the items selected and the merchant name may be displayed in the wallet application 123 such that the user may be confident the proper items are being purchased from the desired vendor. Further, the wallet application 123 may autofill in a shipping data in the merchant app as the shipping data may be included in the encrypted data. Other useful data may be auto-filled such as a phone number or preferred time of delivery.

The token may be communicated from the wallet app 123 to the merchant 185 to complete the transaction. A specific, purpose built processor may be used to communicate transaction details through an API to a merchant as security may need to be heightened. The payment token 170 may be communicated from the merchant 185 to the payment provider 175 for verification. The token 170 may be reviewed by a verification server 175 and a result of the verification may be communicated to the merchant 185. Assuming the verification is successful, the successful transaction may be communicated to the user.

Figure 4:
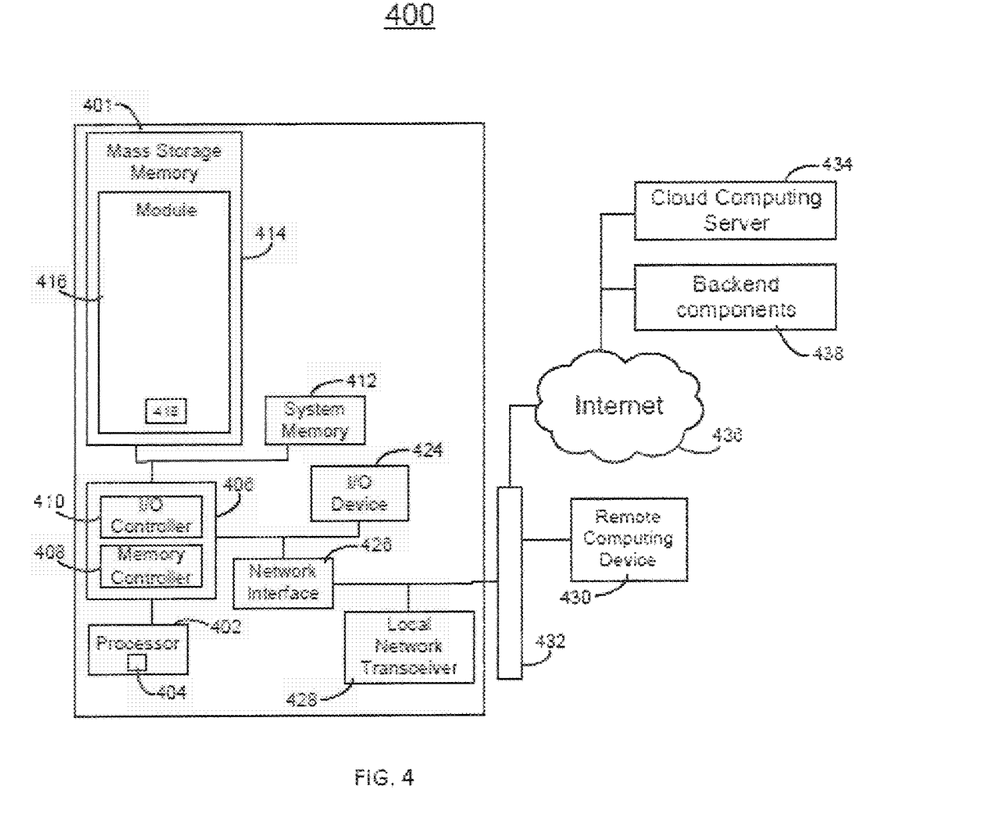
FIG. 4 illustrates a sample computer system that may be used as part of the computer system.

FIG. 4 may be a high-level block diagram of an example computing environment 400 for the system and methods for enrolling and linking a payment devices, wallet applications and the payment system 100 as described herein. The computing device 401 may include a server (e.g., the payment processing server 116, the marketing documents server 128, etc.), a mobile computing device (e.g., the consumer computing device 103, a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods for enrolling and linking a payment device to marketing documents, offers, and other information and dynamic objects may be used to implement and execute the example systems of FIG. 1. Although the example system 400 is described below as including a plurality of peripherals, interfaces, chips, memories, etc., one or more of those elements may be omitted from other example processor systems used to implement and execute the example system for enrolling and linking a payment device to marketing documents, offers, and other information and dynamic objects. Also, other components may be added.

As shown in FIG. 4, the computing device 401 includes a processor 402 that is coupled to an interconnection bus. The processor 402 includes a register set or register space 404, which is depicted in FIG. 4 as being entirely on-chip, but which could alternatively be located entirely or partially off-chip and directly coupled to the processor 402 via dedicated electrical connections and/or via the interconnection bus. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus.

The processor 402 of FIG. 4 is coupled to a chipset 406, which includes a memory controller 408 and a peripheral input/output (I/O) controller 410. As is well known, a chipset typically provides I/O and memory management functions as well as a plurality of general purpose and/or special purpose registers, timers, etc. that are accessible or used by one or more processors coupled to the chipset 406. The memory controller 408 performs functions that enable the processor 402 (or processors if there are multiple processors) to access a system memory 412 and a mass storage memory 414, that may include either or both of an in-memory cache (e.g., a cache within the memory 412) or an on-disk cache (e.g., a cache within the mass storage memory 414).

The system memory 412 may include any desired type of volatile and/or non-volatile memory such as, for example, static random access memory (SRAM), dynamic random access memory (DRAM), flash memory, read-only memory (ROM), etc. The mass storage memory 414 may include any desired type of mass storage device. For example, if the computing device 401 is used to implement a module 416 (e.g., the various modules to enroll and link a payment device to marketing documents, offers, and other information and dynamic objects and other modules as herein described). The mass storage memory 414 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 100. Thus, a module, block, function, operation, procedure, routine, step, and method can be implemented in hardware, firmware, and/or software. In one embodiment, program modules and routines are stored in mass storage memory 414, loaded into system memory 412, and executed by a processor 402 or can be provided from computer program products that are stored in tangible computer-readable storage mediums (e.g. RAM, hard disk, optical/magnetic media, etc.).

The peripheral I/O controller 410 performs functions that enable the processor 402 to communicate with a peripheral input/output (I/O) device 424, a network interface 426, a local network transceiver 428, (via the network interface 426) via a peripheral I/O bus. The I/O device 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 424 may be used with the module 416, etc., to receive data from the transceiver 428, send the data to the backend components of the system 100, and perform any operations related to the methods as described herein. The local network transceiver 428 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 408 and the I/O controller 410 are depicted in FIG. 4 as separate functional blocks within the chipset 406, the functions performed by these blocks may be integrated within a single integrated circuit or may be implemented using two or more separate integrated circuits. The computing environment 400 may also implement the module 416 on a remote computing device 430. The remote computing device 430 may communicate with the computing device 401 over an Ethernet link 432. In some embodiments, the module 416 may be retrieved by the computing device 401 from a cloud computing server 434 via the Internet 436. When using the cloud computing server 434, the retrieved module 416 may be programmatically linked with the computing device 401. The module 416 may be a collection of various software platforms including artificial intelligence software and document creation software or may also be a Java® applet executing within a Java® Virtual Machine (JVM) environment resident in the computing device 401 or the remote computing device 430. The modeling module 420 and the execution module 422 may also be "plug-ins" adapted to execute in a web-browser located on the computing devices 401 and 430. In some embodiments, the module 416 may communicate with back end components 438 such as the backend components 104 of FIG. 1 via the Internet 436.

The system 400 may include but is not limited to any combination of a LAN, a MAN, a WAN, a mobile, a wired or wireless network, a private network, or a virtual private network. Moreover, while only one remote computing device 430 is illustrated in FIG. 4 to simplify and clarify the description, it is understood that any number of client computers are supported and can be in communication within the system 400.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Still further, the figures depict preferred embodiments of a system for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for a system and a process for automatically extracting, transforming, and loading content data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

As a result of the system 100, more users may desire to use a mobile wallet 123 due to the ease of only entering a contact and then selecting a link to open the wallet application 123. Further, merchants may be inclined to use the system 100 as the programming necessary to add the functionality is reduced. By providing the necessary physical equipment such as the processors and servers described in FIG. 4 which may be adapted to be verification servers, token servers, communication servers, etc., to give life to the system, transactions may be easier for users and merchants.

The invention claimed is:

1. A system for creating communications to effectuate a purchase using an electronic wallet application, the electronic wallet application stored and executed on a mobile computing device, the system comprising:
   a first processor of a payment server;
   a first memory in communication with the first processor, the first memory storing instructions, that when executed by the first processor, cause the first processor to,
      receive data from a merchant consisting of: a mobile number corresponding to the mobile computing device and a mobile wallet account of the electronic wallet application, an indicator of an item selected for purchase, and a merchant identifier; and
      communicate a response message to the mobile computing device using the mobile number, the response message including a URL to the electronic wallet application, the URL including payment details, wherein payment details include an APP-ID, a Store/Merchant-ID, and the item selected details;
   a second processor of the mobile computing device;
   a second memory in communication with the second processor, the second memory storing instructions, that when executed by the second processor, cause the processor to:
      receive the response message;
      redirect a browser of the mobile computing device to open the electronic wallet application of the mobile computing device based on the URL of the response message;
      populate the electronic wallet application with the payment details of the URL;
      create a transaction in the electronic wallet application using the payment details of the response message;
      verify the electronic wallet application using the APP-ID; and
      communicate the item selected details and transaction details through an API to the merchant.

2. The system of claim 1, wherein the first memory stores further instructions, upon execution by the second processor, for:
   receiving a sign in to a payment application;
   verifying authorization to use the payment application;
   in response to the authorization being verified,
      receiving a mobile number;
      communicating a test message to the mobile number wherein the test message comprises a URL;
      in response to an acceptable message being received from the URL, storing that the mobile number is verified as being related to the electronic wallet system.

3. The system of claim 1, wherein the APP-ID, Store/Merchant-ID and Card Details follow a pre-determined protocol.

4. The system of claim 1, wherein the URL contains the payment details and the payment details are utilized by the electronic wallet system.

5. The system of claim 1, wherein the payment details are stored remotely and are accessed by the electronic wallet system, to display and complete the transaction.

6. The system of claim 1, wherein the payment details include a payment token.

7. The system of claim 6, wherein the first memory stores further instructions, upon execution by the first processor, for sending the payment token with the payment details to the electronic wallet system.

8. The system of claim 7, wherein the second memory stores further instructions, upon execution by the first processor, for communicating the payment token from the electronic wallet system to the merchant.

9. The system of claim 8, wherein the first memory stores further instructions, upon execution by the first processor, for receiving the payment token from the merchant for verification.

10. The system of claim 1, wherein the URL links to a wallet system wherein the electronic wallet system is pre-populated with the store and the selected items.

11. The system of claim 1, wherein the item selected for purchase and the merchant identifier are received from a merchant web site or a merchant application.

12. The system of claim 1, wherein the APP-ID comprises a Team ID and a bundle ID search string.

13. The system of claim 1, wherein the second memory stores instructions, upon execution by the second processor, for transferring funds to the merchant using the Store/Merchant-ID.

14. The system of claim 1, wherein the items selected are displayed in the electronic wallet system.

15. The system of claim 9, wherein the payment token includes shipping data.

16. The system of claim 1, wherein the instruction for authenticating the payment details in the URL through the electronic wallet system further comprises receiving a bio identification;
   determining a comparison of a received bio identification to a stored bio identification;
   if the bio identification is scored over a threshold, approving the transaction;
   if the bio identification is scored under a threshold, denying the transaction.

17. A computer-implemented method for creating communications to effectuate a purchase using an electronic wallet application, the electronic wallet application stored and executed on a mobile computing device, the method comprising:
   receiving, by a payment server, an electronic contact message, the electronic contact message consisting of a mobile number corresponding to the mobile computing device and a mobile wallet account of the electronic wallet application, an indicator of an item selected for purchase, and a merchant identifier;
   communicating, by the payment server, a response message to the mobile computing device using the mobile number, the response message including a URL to the electronic wallet application, the URL including payment details, wherein payment details include an APP-ID, a Store/Merchant-ID, and the item selected details;
   receiving, by the mobile computing device, the response message;
   redirecting, by the mobile computing device, a browser of the mobile computing device to open the electronic wallet application of the mobile computing device based on the URL of the response message;
   populating, by the mobile computing device, the electronic wallet application with the payment details of the URL;
   creating, by the mobile computing device, a transaction in the electronic wallet application using the payment details of the response message;
   validating, by the mobile computing device, the electronic wallet application using the APP-ID; and and
   communicating, by the mobile computing device, the item selected details and transaction details through an API to a merchant.

* * * * *